United States Patent [19]

Puthran

[11] Patent Number: 4,633,053
[45] Date of Patent: Dec. 30, 1986

[54] ELECTRICAL DISCHARGE MACHINE WITH AUTOMATICALLY REPLACEABLE ELECTRODES

[75] Inventor: Jayadeva R. Puthran, Ann Arbor, Mich.

[73] Assignee: Raycon Corporation, Ann Arbor, Mich.

[21] Appl. No.: 382,831

[22] Filed: May 27, 1982

[51] Int. Cl.$^4$ .......................... B23H 1/00; B23H 7/26; B65H 1/02; B65H 5/00
[52] U.S. Cl. ..................... 219/69 E; 29/568; 204/224 M; 204/286; 219/69 R; 221/197; 314/5
[58] Field of Search ................ 219/69 E, 69 G, 69 R, 219/138, 69 M, 69 W, 68, 136, 137.2; 204/222, 225, 297 R, 224 M, 286; 226/163, 164, 165, 166, 167; 314/5; 221/197, 198; 29/26 A, 568

[56] References Cited

U.S. PATENT DOCUMENTS

| | | | |
|---|---|---|---|
| 363,611 | 5/1887 | Denison | 314/5 |
| 380,545 | 4/1888 | Berton | 314/5 |
| 1,052,425 | 2/1913 | Ridings | 221/226 |
| 1,083,658 | 1/1914 | Boney | 314/5 |
| 1,229,876 | 6/1917 | Brockie | 314/5 |
| 1,932,263 | 10/1933 | Chapman | 219/57 |
| 2,017,509 | 10/1935 | Osborne | 221/210 |
| 2,174,175 | 9/1939 | Hopkins | 219/137.2 |
| 2,190,150 | 2/1940 | Fay | 219/137.2 |
| 2,195,962 | 4/1940 | Hansen et al. | 219/137.2 |
| 2,395,723 | 2/1946 | Chmielewski | 219/126 |
| 2,504,711 | 4/1950 | Lundahl et al. | 314/5 |
| 2,511,426 | 6/1950 | Bienfait et al. | 219/138 |
| 2,531,181 | 11/1950 | Wilson | 219/137.2 |
| 2,786,958 | 3/1957 | Frey | 403/12 |
| 3,095,520 | 6/1963 | Westfall | 219/69 R |
| 3,125,700 | 3/1964 | Bentley et al. | 219/69 G |
| 3,317,779 | 5/1967 | Henderson | 219/137.62 |
| 3,600,547 | 8/1971 | Turner | 219/69 E |
| 3,609,279 | 9/1971 | Giesbrecht | 219/69 G |
| 3,784,075 | 1/1974 | Portmann | 226/163 |
| 4,305,526 | 12/1981 | Pfleger | 221/197 |
| 4,307,279 | 12/1981 | Inoue et al. | 219/69 M |
| 4,316,071 | 2/1982 | Bonga | 219/69 E |
| 4,438,867 | 3/1984 | Mayne et al. | 221/197 |

FOREIGN PATENT DOCUMENTS

| | | | |
|---|---|---|---|
| 44914 | 2/1982 | European Pat. Off. | 29/568 |
| 2313229 | 10/1973 | Fed. Rep. of Germany | 29/568 |
| 2854035 | 7/1980 | Fed. Rep. of Germany | 219/69 E |
| 2915265 | 10/1980 | Fed. Rep. of Germany | 204/224 M |
| 139835 | 10/1981 | Japan | 219/68 |
| 147441 | 6/1977 | U.S.S.R. | 219/69 E |

Primary Examiner—A. D. Pellinen
Assistant Examiner—Geoffrey S. Evans
Attorney, Agent, or Firm—Stephenson and Boller

[57] ABSTRACT

An electrical discharge machine with automatically replaceable electrodes. The machine includes an electrode holder with a clamp operable to alternately receive and release an electrode, an electrode cartridge containing a plurality of stacked electrodes and a shuttle movable toward and away from the electrode holder. When the shuttle is moved toward the electrode holder, it removes an electrode from the cartridge and moves it into alignment with the electrode holder.

10 Claims, 13 Drawing Figures

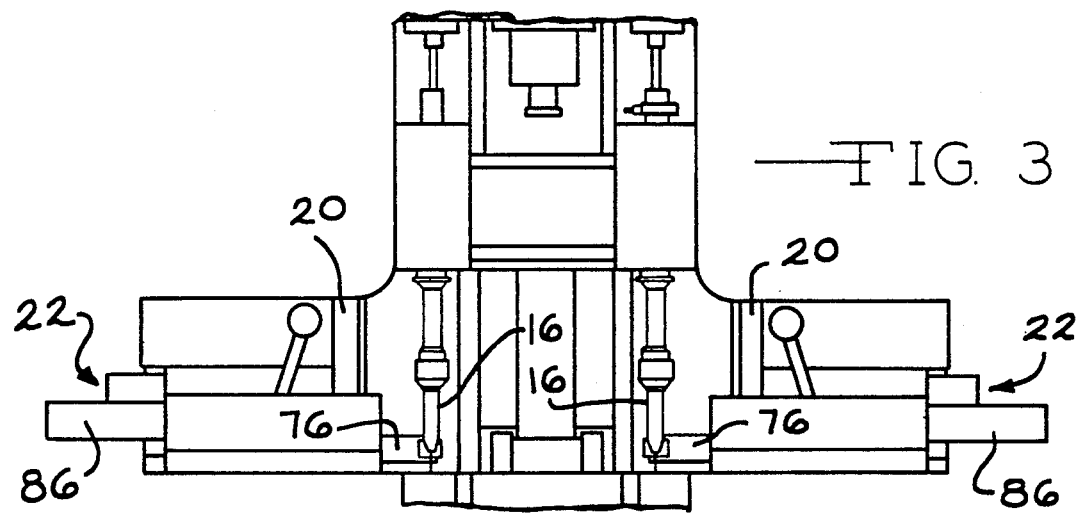
FIG. 3
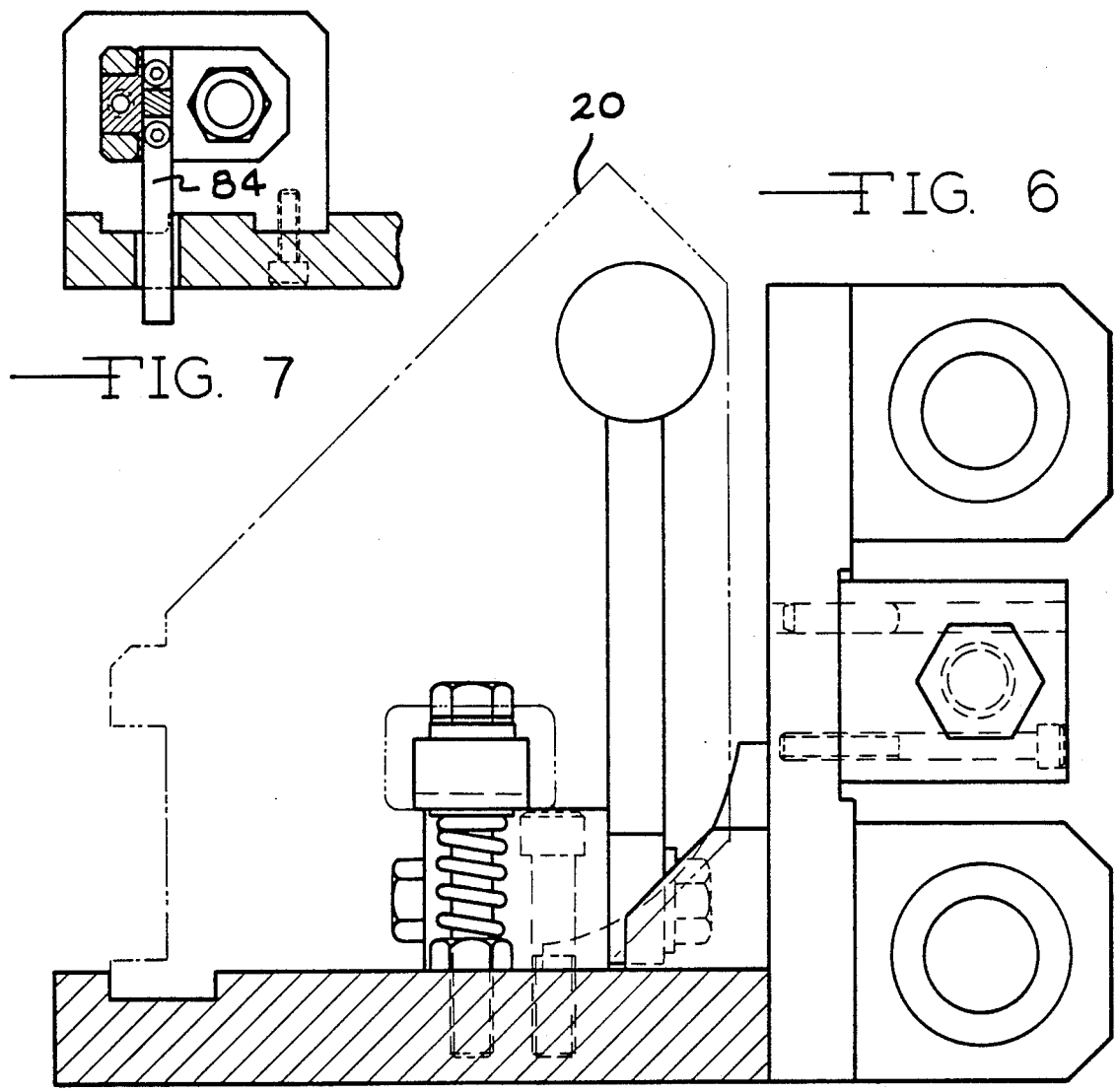
FIG. 7
FIG. 6

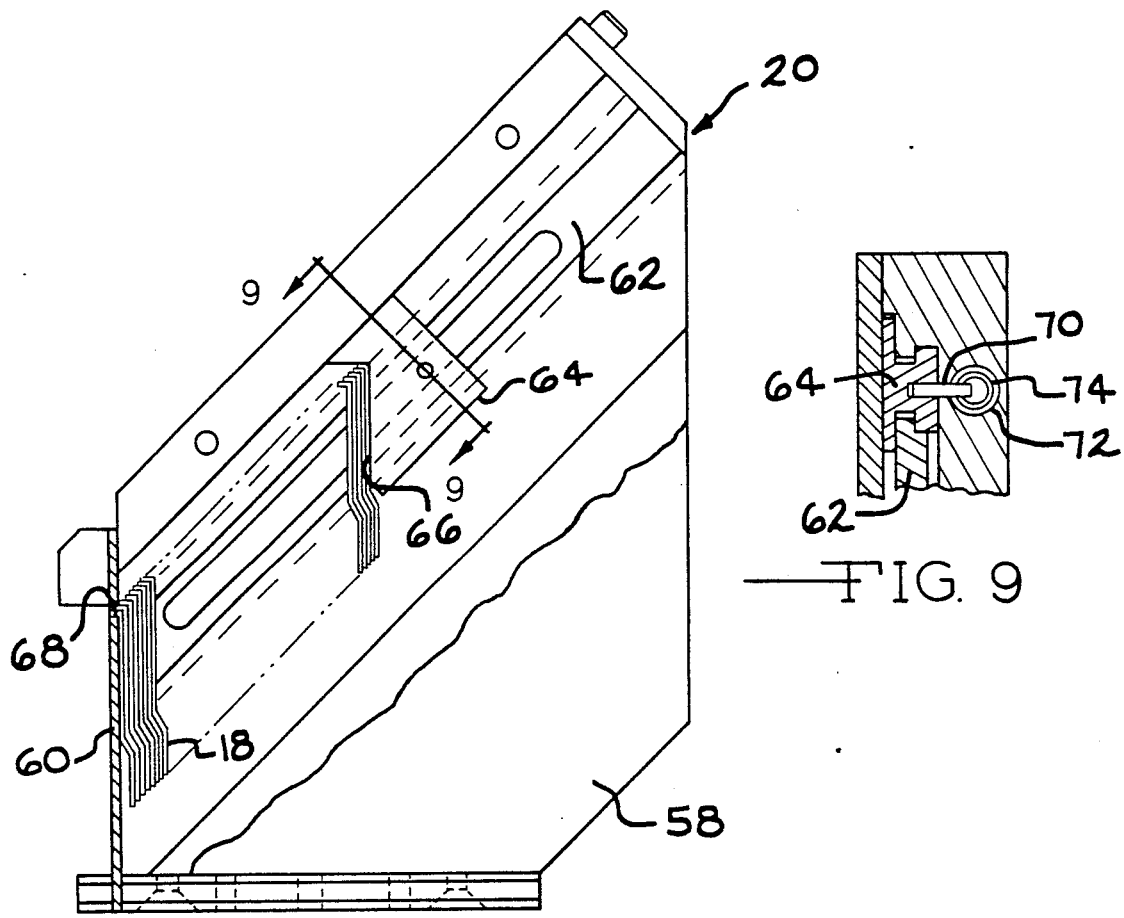

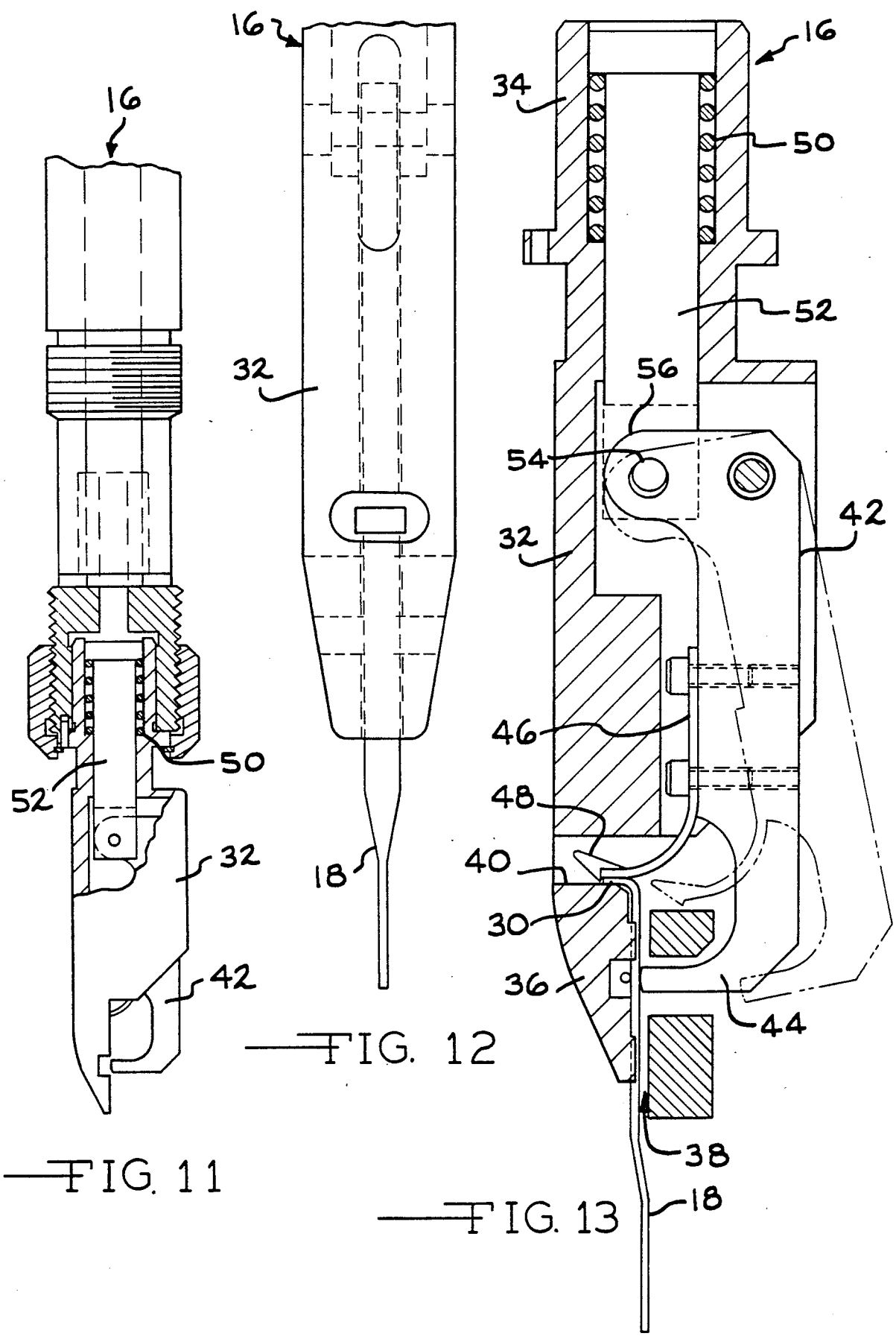

ELECTRICAL DISCHARGE MACHINE WITH AUTOMATICALLY REPLACEABLE ELECTRODES

This invention relates to machines of the type in which a workpiece is machined by electrical discharge through an electrode held by the machine. Electrical discharge results in erosion of the electrode tip. In conventional machines of this type, it is therefore necessary to repeatedly redetermine and readjust the position of the electrode tip in order to ensure precise machining of the workpiece. It is also necessary to periodically replace electrodes, which requires substantial time and effort. It is an object of the present invention, therefore, to provide an improved electrical discharge machine wherein electrodes are automatically replaceable. Another object of this invention is to provide an electrical discharge machine in which the position of the electrode tip is automatically established at a specific desired location.

SUMMARY OF THE INVENTION

The present invention provides an electrical discharge machine in which used electrodes are automatically ejected and replaced with new electrodes. The machine consists of an electrode holder movable toward and away from the workpiece, an electrode cartridge in which a stack of electrodes is positioned for ultimate placement within the electrode holder, and shuttle means movable toward and away from the electrode holder operable to remove an individual electrode from the cartridge and move it into alignment with the electrode holder. Any number of holders and associated cartridges and shuttle means may be provided at various points on the machine so that a number of machining operations can be performed at the same time. The machine is also adaptable to accommodate electrodes of various sizes and shapes.

The electrode holder consists of a body having an upper and a lower end, a groove formed in the lower end of the body which is capable of receiving an electrode and a clamping arm pivotally mounted on the body. The clamping arm is movable between a clamping position, in which it engages the electrode and clamps it against the body of the holder, and a releasing position in which the arm is removed from contact with the electrode, thereby allowing it to be released from the holder. A spring strip is attached to the clamping arm so that when the clamping arm is moved to the releasing position, the spring strip forces the electrode out of the groove and thus out of the holder. The clamping arm is spring loaded so that it is biased toward the clamping position. A solenoid and associated plunger are located in the upper end of the holder body. Operation of the solenoid to move the plunger downwardly against the clamping arm causes the arm to be moved to the releasing position. Subsequent reverse operation of the solenoid, combined with the spring action of the clamping arm, causes the arm to be moved to the clamping position.

The electrode cartridge consists of a body having a front wall, a slot in the side of the body through which an individual electrode can be removed, a track which terminates at the front wall and a pusher mounted on the track. A plurality of electrodes may be positioned on the track between the front wall and the pusher. Spring means are provided on the pusher so that it urges the electrodes toward the front wall. The electrodes may be arranged on the track in any convenient manner, as long as there is always an electrode positioned in the slot. When an electrode is removed through the slot, the pusher moves the remaining electrodes toward the front wall and another electrode becomes positioned in the slot.

The shuttle means comprises a first slide member movable toward and away from the electrode holder and a second slide member movable toward and away from the first slide member. A stop shoulder and associated clamp means are provided on the first slide member. The second slide member is aligned with the slot on the electrode cartridge and with the stop shoulder on the first slide member so that when the first slide member is retracted and the second slide member is moved toward the stop shoulder, it removes an electrode from the cartridge and transports it to a position in which it is held between the stop shoulder and the clamp means. The electrode is then transported by the first slide member to a position in which it is received by the electrode holder.

In forming an opening in a workpiece, a typical work cycle might be as follows. First, a used electrode is utilized to form a rough opening. The solenoid on the electrode holder is then operated to eject the used electrode. The second slide member is then advanced to remove the electrode from the cartridge and place it on the first slide member. Next, the first slide member is advanced to place the electrode in the electrode holder. Finally, the solenoid on the electrode holder is operated to move the clamping arm to the clamping position, thereby securing the new electrode within the holder. The new electrode is then utilized to form a finished opening in the workpiece.

The invention thus provides an improved electrical discharge machine in which the time and effort of manual replacement of electrodes is avoided. Readjustment of the position of the electrode tip is never necessary, since the feed mechanism always places the electrode in the same position. Furthermore, the operations performed by the present machine are more precise than conventional machines because a new electrode is always used to finish the machining process. The machine of this invention is capable of being used to form slots and openings of various sizes and shapes in various types of workpieces.

Further objects, features and advantages of this invention will become apparent from a consideration of the following description, the appended claims and the accompanying drawings in which:

FIG. 3 is a front view of the machine, showing the shuttle means advanced so as to place an electrode within the electrode holder;

FIG. 6 is a side view taken from substantially the line 6—6 in FIG. 5;

FIG. 7 is a side view taken from the line 7—7 in FIG. 5;

FIG. 8 is an enlarged fragmentary side view of the electrode cartridge, with portions of the housing thereof broken away for purpose of clarity;

FIG. 9 is a transverse sectional view of the electrode cartridge, as seen from substantially the line 9—9 in FIG. 8;

FIG. 10 is a perspective view of one type of electrode to which the machine of this invention is adapted;

FIG. 11 is a side view of the electrode holder of this invention, with portions of the body thereof broken away for the purpose of clarity;

FIG. 12 is a front view of the electrode holder with an electrode positioned therein; and FIG. 13 is an enlarged side sectional view of the electrode holder with the clamping position of the clamping arm thereof shown in solid lines and the releasing position of the arm shown in broken lines.

Figure 1:
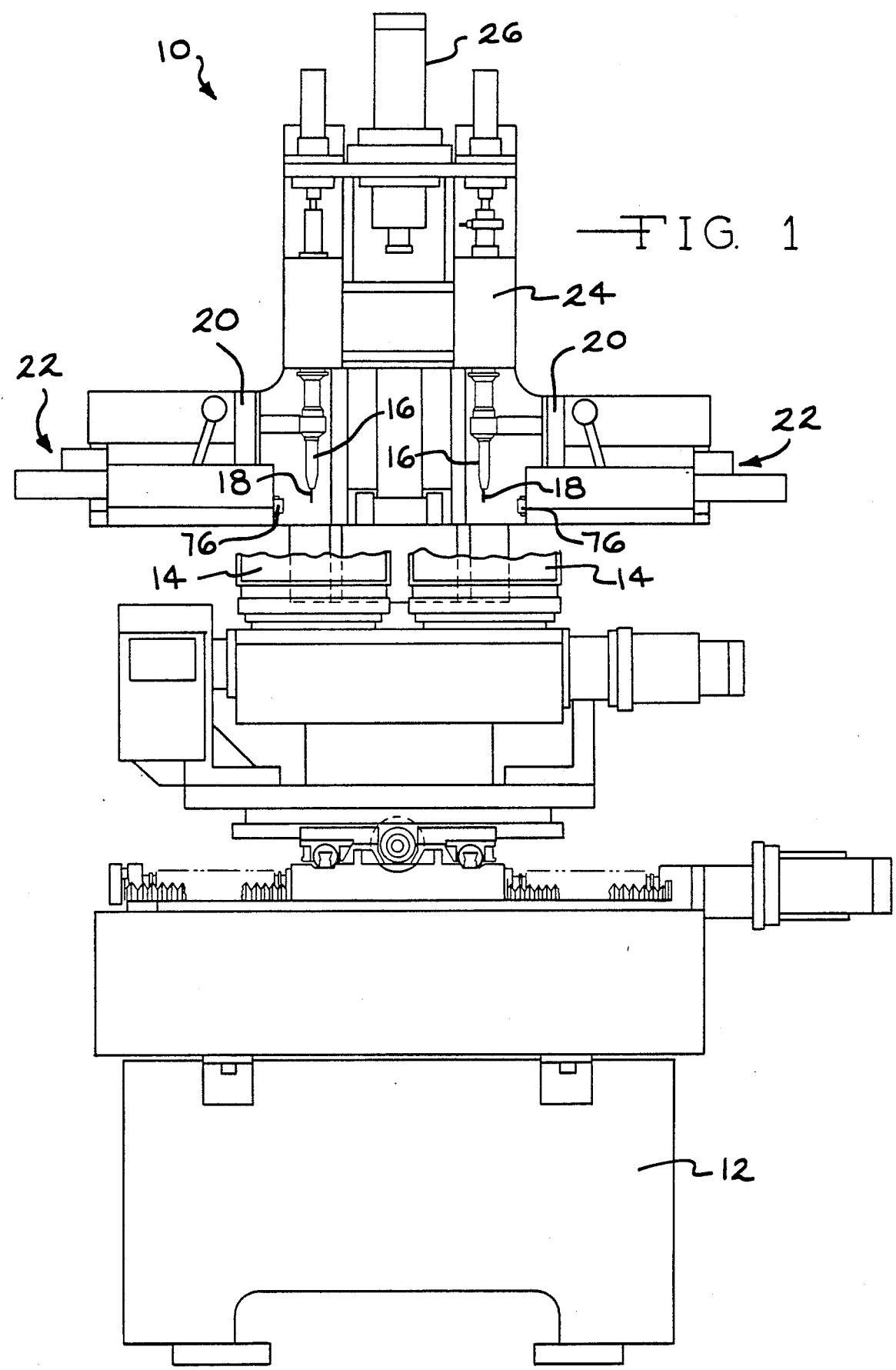
FIG. 1 is a front view of the electrical discharge machine of this invention.
Figure 2:
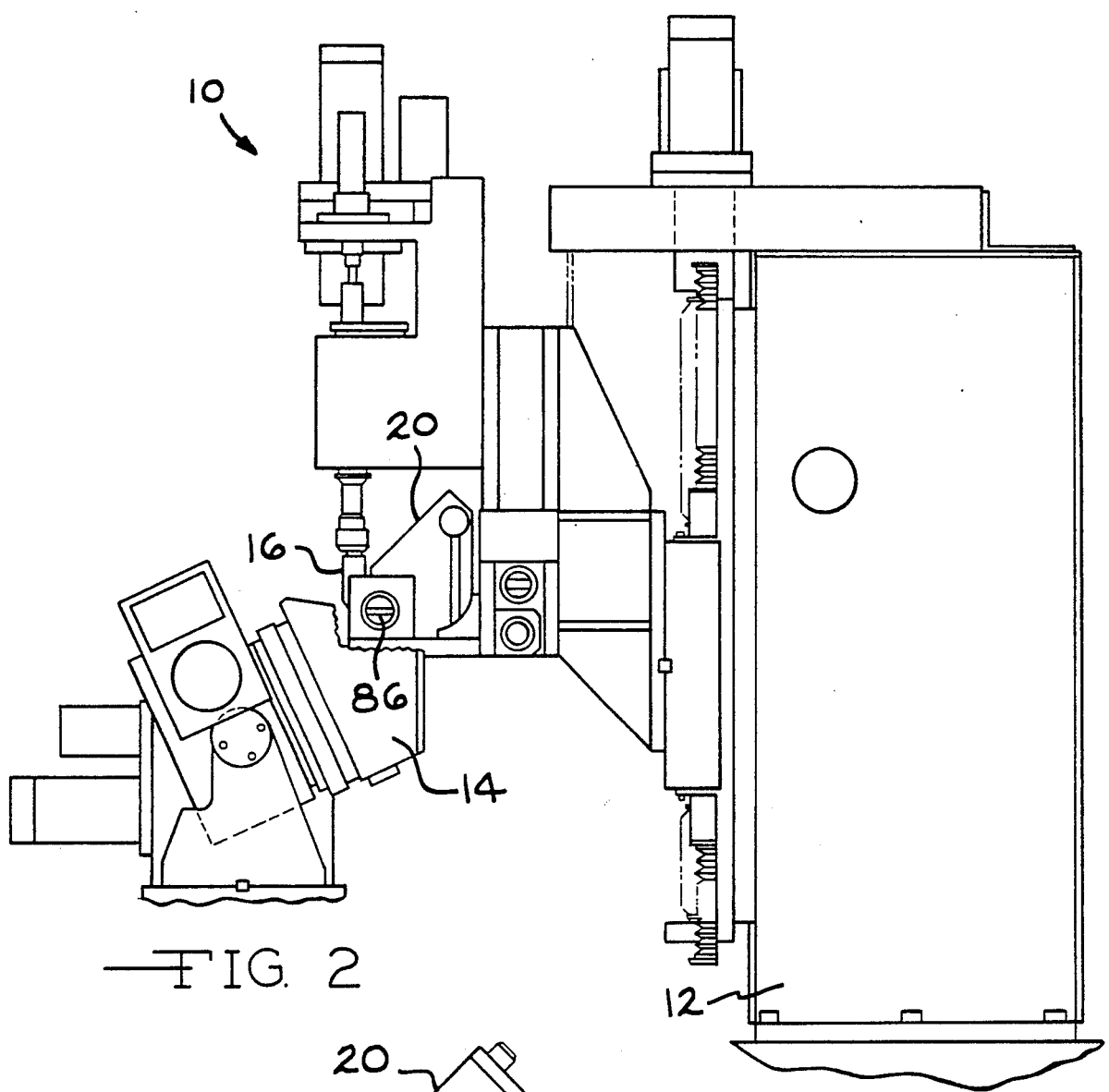
FIG. 2 is a side view of the electrical discharge machine.
Figure 4:
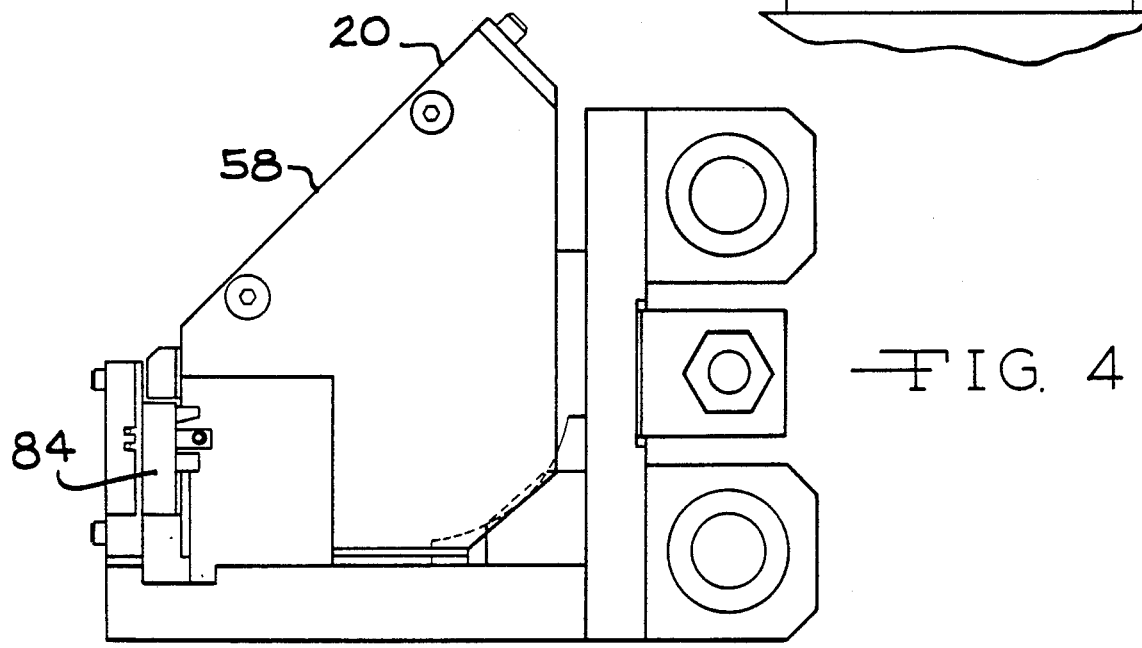
FIG. 4 is an enlarged fragmentary side view showing the electrode cartridge.

With reference to the drawings, the electrical discharge machine of this invention, indicated generally at 10 in FIG. 1, consists of a main frame 12 on which workpiece holders 14 are mounted. One or more electrode holders 16, each of which carries an electrode 18, are mounted on the frame 12. Associated with each electrode holder 16 are an electrode cartridge 20 and shuttle means, indicated generally at 22. In FIGS. 1 and 3, a pair of electrode holders 16 and associated cartridges 20 and shuttle means 22 are shown. However, it is to be understood that the machine 10 is capable of employing any number of holders 16 and the associated apparatus. If more than one electrode holder 16 is used, the holders 16 may move independently of each other and may perform different functions. In the alternative, as depicted in FIGS. 1 and 3, the holders 16 may move together and perform the same function. The holders 16 shown in FIG. 1 are mounted for up and down movement on a head 24 that slides up and down on the frame 12 in response to movement of a cylinder assembly 26.

A typical electrode is pictured in FIG. 10, and includes a tip 28 and an upper lip 30. In electrical discharge machining, different types of machining operations require different types of electrodes. The machine 10 of this invention is adaptable to various sizes and shapes of electrodes, and the invention is not limited to an electrode of any particular size and shape. However, for the purpose of simplicity of description, the invention will hereinafter be described with reference to electrodes 18 of the type shown in FIG. 10.

As seen in FIG. 13, each electrode holder 16 has a body 32 which has an upper end 34 and a lower end 36. A vertical groove 38 adapted to receive an electrode 18 is formed in the lower end 36 of the body 32 and a horizontal ridge 40 is provided at the upper end of the groove 38 so that when an electrode 18 is in the groove 38 its upper lip 30 rests on the ridge 40. A clamping arm 42 is pivotally mounted on the body 32 for movement between a clamping position, in which the lower end 44 of the arm 42 forces the electrode against the lower end 36 of the body 32, and a releasing position in which the arm 42 is removed from contact with the electrode 18. A spring strip 46 is mounted on the clamping arm 42 and has a flexible hooked end 48. When the clamping arm 42 is moved to the clamping position, the hooked end 48 slides across the upper lip 30 of the electrode 18 and snaps into place adjacent the forward edge of the lip. When the clamping arm 42 is moved to the releasing position, the hooked end 48 of the spring strip 46 forces the electrode 18 away from the body 32 and ejects it through the groove 38.

The clamping arm 42 is spring loaded so that it favors the clamping position. A solenoid 50 and an associated plunger 52 are provided in the upper end 34 of the body 32. The plunger 52 is movable upon operation of the solenoid 50 between a retracted position and an advanced position. When the plunger 52 is advanced, it contacts a pin 54 which is connected to a flange 56 on the clamping arm 42, thus forcing the arm 42 to its releasing position. When the plunger 52 is retracted, the arm 42 automatically returns to its clamping position.

With reference now to FIG. 8, the electrode cartridge 20 consists of a body 58 which has a front wall 60. A track 62, on which a pusher member 64 is mounted, is positioned within the cartridge 20 so as to terminate at the front wall 60. The cartridge 20 is adapted to carry a plurality of electrodes 18. The electrodes 18 may be arranged on the track 62 in any convenient manner. In a prefered embodiment, the electrodes 18 are arranged in a stack such that the upper lip 30 of each electrode 18 rests on the upper lip 30 of an adjacent forward electrode. In such a formation, the stack inclines upwardly toward the rear and the track 62 may be positioned so that it inclines accordingly, as seen in FIG. 8. The pusher 64 has a forward surface 66 so that the stack of electrodes is contained between the front wall 60 and the forward surface 66 of the pusher 64.

The front wall 60 is provided with a horizontal ridge 68 on which the upper lip 30 of the forwardmost electrode 18 can be moved along the ridge 68 and removed out of the cartridge 20 through the slot 69. The pusher 64 is spring loaded so as to urge the stack of electrodes 18 toward the front wall 60. Thus, when the forwardmost electrode is removed, the remaining electrodes are pushed forwardly so that another electrode is positioned on the ridge 68. As seen in FIG. 9, the spring means comprises a pin 70 secured to the pusher 64 and extending sideways therefrom, a cylinder 72 secured to the pin 70 and extending longitudinally of the track 62 and a coil spring 74 which is fixed on the body 58 of the cartridge 20 and exerts a spring pressure on the cylinder 72.

Figure 5:
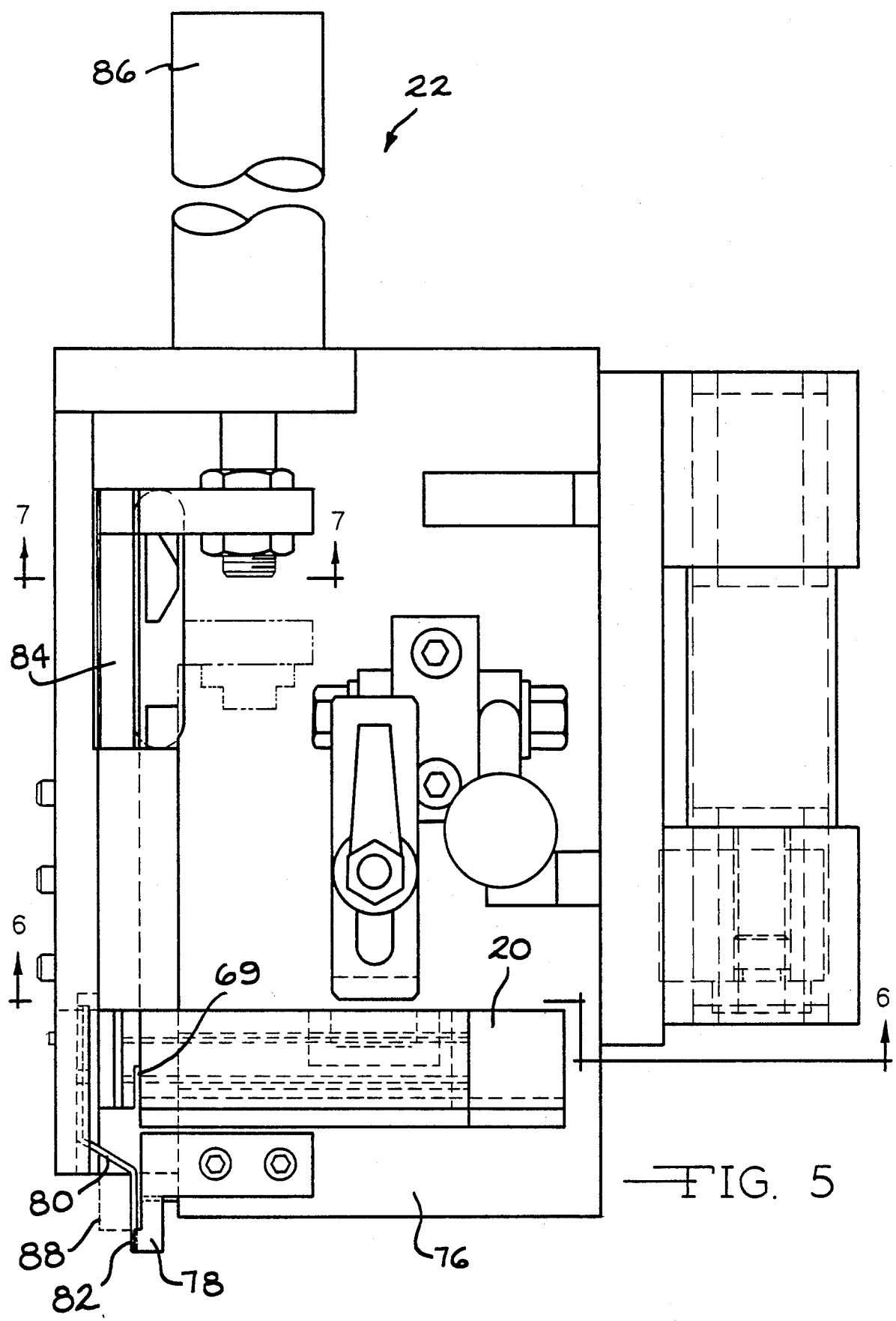
FIG. 5 is a top view.

As seen in FIG. 5, the shuttle means 22 includes a first slide member 76 which is movable toward the electrode holder 16 to an advanced position and away from the electrode holder 17 to a retracted position. FIGS. 1 and 5 show the first slide member 76 in a retracted position, while FIG. 3 shows it in an advanced position. A stop shoulder 78 is provided on the first slide member 76 and a releasable clamp 80 affixed to the member 76 has an end portion 82 which presses against the stop shoulder 78.

The shuttle means 22 further includes a second slide member 84 which is movable in response to actuation of a slide cylinder 86 toward and away from the first slide member 76. The second slide member 84 is aligned with the cartridge 20 and the first slide member 76 so that when the first slide member 76 is retracted and the second slide member 84 is moved toward the first slide member 76, the end portion 88 of the second slide member 84 engages the forwardmost electrode 18 in the cartridge 20 and pushes it toward the stop shoulder 78. The electrode 18 is ultimately moved to a position wherein it is held between the stop shoulder 78 and the clamp 80. When the electrode 18 is in this position, subsequent advancement of the first slide member 76 (FIG. 3) moves the electrode into alignment with the electrode holder 16.

A typical work cycle for the machine 10 in forming an opening in a workpiece is as follows. A used electrode may first be utilized to form a rough opening in the workpiece. The solenoid 50 is operated to advance the plunger 52 and move the clamping arm 42 to its releasing position, thereby ejecting the used electrode. The slide cylinder 86 is then operated to move the second slide member 84 toward the first slide member 76. The second slide member 84 removes an electrode from the cartridge 20 and deposits it on the first slide member 76. The slide member 76 is then advanced so that the new electrode 18 is received into the groove 38 on the electrode holder 16. Finally, the solenoid 50 is operated to retract the plunger 52 and move the clamping arm 42 to the clamping position. The electrode holder 16 can then be moved downwardly toward the workpiece so that a finished opening can be formed with the new electrode.

The invention thus provides an improved electrical discharge machine 10 in which used electrodes 18 are automatically ejected and replaced with new electrodes 18. The machine 10 obviates the need for manual replacement and readjustment of electrodes, thereby saving substantial time and effort. The machine 10 is therefore capable of more precise and more diverse types of machining operations.

I claim:

1. In an electrical discharge machine, an electrode cartridge comprising a body, a front wall and a side wall on said body, a slot in said side wall adjacent said front wall through which an individual electrode can be removed, a track member on said body terminating at said front wall, a plurality of upright electrodes arranged in a stack and positioned on said track member so that one of said electrodes contacts said front wall, and a pusher member mounted on said track member operable to urge said electrodes toward said front wall, spring means secured to said cartridge body and operable to apply spring pressure to said pusher member acting to urge said pusher member toward said front wall and means operable to bodily displace the one electrode contacting the front wall sideways in a direction transversely from the stack, and further means for transporting the displaced electrode to a position where it can be loaded into a holder.

2. In an electrical discharge machine, the electrode cartridge according to claim 1 wherein said track member is inclined downwardly toward said front wall.

3. In an electrical discharge machine in which a conductive workpiece is machined by electrical discharge through an electrode held by the machine, an electrode holder movable toward and away from the workpiece, removable clamp means on said holder operable to alternately receive and release an electrode, an electrode cartridge containing a plurality of identical electrodes arranged in a stack in said cartridge and shuttle means movable toward and away from said electrode holder operable to remove an electrode from said cartridge and move it into alignment with said electrode holder, and wherein said shuttle means comprises a first slide member movable between a retracted position and an advanced position underlying said electrode holder, a stop shoulder on said first slide member, a clamp member secured to said first slide member and having an end portion which removably abuts said stop shoulder and a second slide member movable toward and away from said stop shoulder operable to remove an electrode from the electrode cartridge and transport said electrode to a position wherein it is held between said stop shoulder and said clamp member so that subsequent movement of said first slide member to said advanced position brings said electrode into alignment with said electrode holder.

4. In an electrical discharge machine in which a conductive workpiece is machined by electrical discharge through an electrode held by the machine, an electrode holder movable toward and away from the workpiece, removable clamp means on said holder operable to alternately receive and release an electrode, an electrode cartridge containing a plurality of identical electrodes arranged in a stack in said cartridge and shuttle means movable toward and away from said electrode holder operable to remove an electrode from said cartridge and move it into alignment with said electrode holder, wherein said electrode holder comprises a body having a groove located to receive an electrode, a clamping arm pivotally secured on said body for movement between a clamping position, in which the electrode is held by said arm against said body, and a releasing position in which said arm is removed from contact with said holder, and wherein said electrode holder further includes a spring strip secured to said clamping arm operable upon movement of said clamping arm to said releasing position to engage said electrode to thereby move said electrode away from said body.

5. The electrical discharge machine according to claim 4 wherein said electrode holder further includes spring means operable to urge said clamping arm toward said clamping position.

6. The electrical discharge machine according to claim 4 wherein said electrode holder further includes a solenoid and a plunger operatively associated with said solendid, said plunger being movable upon activation of said solenoid between a retracted position and an advanced position wherein said plunger engages said clamping arm to move said arm to said releasing position.

7. In an electrical discharge machine an electrode holder movable toward and away from a conductive workpiece, said holder comprising a body having upper and lower ends and locating means in the lower end of said body operable to receive an electrode, a clamping arm pivotally-mounted on said body for movement between a clamping position, in which said arm engages the electrode and clamps it against said locating means, and a releasing position, in which said arm is removed from contact with said electrode allowing it to be released, and pivot means operable to pivot said clamping arm between said clamping and releasing position, and further including a spring strip secured to said clamping arm operable upon movement of said arm from said clamping position to said releasing position to engage the electrode to thereby remove it from contact with said body and eject it from said holer.

8. In an electrical discharge machine, the electrode holder according to claim 7 wherein said pivot means comprises a spring member operable to urge said clamping arm toward said clamping position, a solenoid contained in the upper end of said electrode holder body and a plunger being operable upon activation of said solenoid to contact said clamping arm add pivot it to said releasing position.

9. In an electrical discharge machine in which electrodes are held in a stack for ultimate placement in an electrode holder, electrode feed means comprising a first slide member movable toward and away from said electrode holder, stop means on said first slide member, a clamp member on said first slide member having an end portion which releasably abuts said stop means and a second slide member movable toward and away from said stop means, said second slide member being aligned with said stop means and said stack of electrodes so that upon movement toward said stop means said second slide member removes an electrode from said stack and moves said electrode to a position wherein it is held said stop means and said clamp member.

10. In an electrical discharge machine, the electrode feed means according to claim said first and second slide members are movable in parallel directions.

* * * * *